United States Patent Office 2,943,514
Patented July 5, 1960

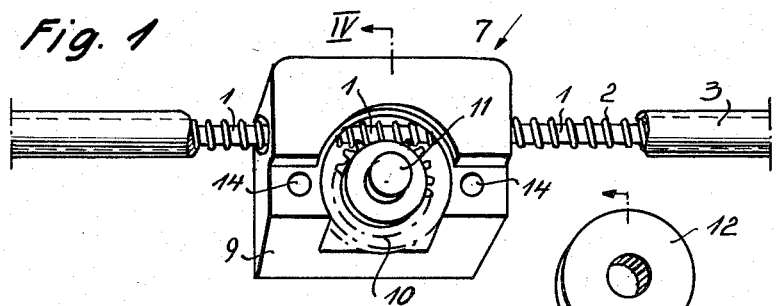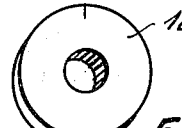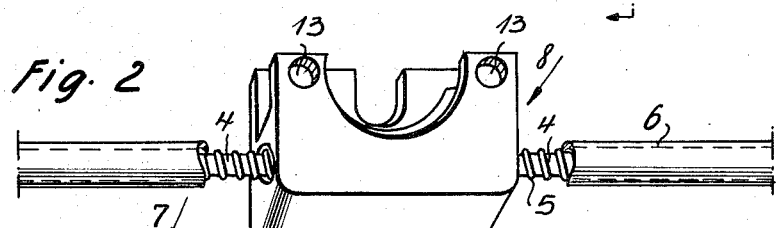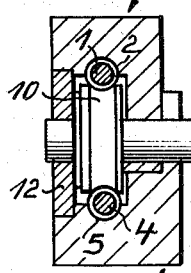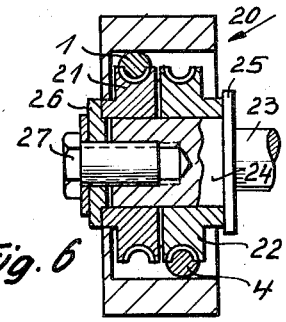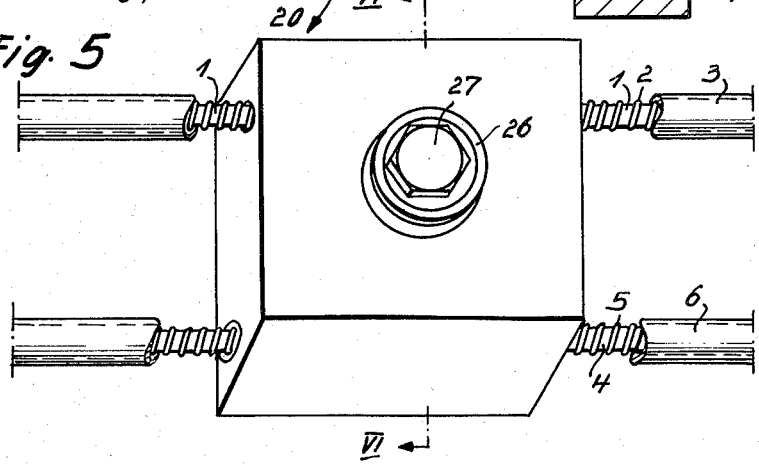

2,943,514

DEVICES FOR CAUSING TWO LONGITUDINALLY-EXTENDING MEMBERS TO MOVE LENGTHWISE IN OPPOSITE DIRECTIONS

Hans Golde, 338 Hanauer Landstrasse, Frankfurt am Main, Germany

Filed Dec. 31, 1958, Ser. No. 784,172

Claims priority, application Germany Jan. 9, 1958

9 Claims. (Cl. 74—665)

This invention relates to a device for causing two longitudinally-extending members to move lengthwise in opposite directions.

Up to the present time, devices for causing cables to move lengthwise in opposite directions have each included a gear-wheel disposed in a closed cable housing, the gear meshing on respective sides with two threaded cables, so that, when the gear is rotated, the two cables are driven simultaneously in opposite directions.

Owing to this positive coupling of the movement of the cables, difficulties frequently arise in practice if the effective length of one of the cables is to be altered without involving corresponding alteration of the effective length of the other cable, since adjustment of the effective lengths of the cables independently of one another is not readily possible.

If, for example, the devices are to be used for opening and closing the sliding roofs of motor vehicles, the ends of the cables are generally firmly attached to the sliding roofs before the latter are mounted in the vehicles, and, after mounting of the sliding roofs, the lengths of cable between the sliding roofs and the devices are adjusted by rotating the relevant gear-wheels. Unfortunately, if, for each device, the necessary adjustments of the effective lengths of the two cables are not the same, the attachment of one cable to the sliding roof must be broken and the cable must then be re-attached to the roof at a different location or a portion thereof must be cut off before re-attachment. In the confined space of a motor vehicle, this operation is awkward to perform and involves considerable waste of time.

According to the present invention there is provided a device, for causing two longitudinally-extending members to move lengthwise in opposite directions, comprising a housing, driving wheel means disposed within said housing, a shaft connected to said driving wheel means for driving the same, means for guiding one longitudinally-extending member past one side of said driving wheel means in driving engagement therewith, further means for guiding the other longitudinally-extending member past the other side of said driving wheel means in driving engagement therewith, and means operable to release at least one of said longitudinally-extending members from driving connection with the shaft.

In order that the invention may be clearly understood and readily carried into effect, reference will now be made, by way of example, to the accompanying drawings, in which:

Figure 1 shows a perspective view mainly of part of a device for causing two longitudinally-extending members to move lengthwise in opposite directions, Figure 2 shows a perspective view mainly of another part of the device, Figure 3 shows a perspective view of a further part of the device, Figure 4 shows a section, through the device when assembled, taken along the line IV—IV in Figures 1 to 3, Figure 5 shows a perspective view mainly of a modified version of the device shown in Figure 4, and Figure 6 shows a section, through the modified version, taken along the line VI—VI in Figure 5.

Referring to Figures 1 to 4, the device is arranged to move two identical cables 1 and 4 lengthwise in opposite directions. The cables 1 and 4 have identical screw-threads 2 and 5, respectively, and are arranged to run within guide tubes or cable sheaths 3 and 6, respectively. Both cables are so guided in respective parts 7 and 8 of a two-part cable housing that the screw-threads 2 and 5 mesh with respective sides of a gear wheel 10 when the two housing parts 7 and 8 are united. The gear-wheel 10 is rotatable with a driving shaft 11, and the two parts 7 and 8 are adapted to be connected together, with the interposition of a washer 12, by means of two screws (not shown) which are intended to pass through respective holes 13 in the part 8 and to engage with screw-threading on the inside of respective bores 14 formed in the part 7 and corresponding to the holes 13. The chief plane 9 of separation between the two parts 7 and 8 preferably extends off-centre, and shown.

Before permanent assembly and mounted of the device, the cable 4, while it is not in engagement with the worm gear 10, can be pulled lengthwise, as far as desired, through the part 8 of the housing whilst, independently of the cable 4, the effective length of the cable 1 can be adjusted by rotation of the gear 10. Thereafter, the device can be assembled and mounted in a permanent position. It will be seen that the screws which engage in the holes 13 and the bores 14 constitute means which are operable to release the cable 4 from driving connection with the shaft 11.

Referring to Figures 5 and 6, an integral housing 20 so guides the two cables 1 and 4 that they are held in mesh with gear-wheels 21 and 22, respectively. The two gear-wheels 21 and 22 take the form of annuli and are mounted co-axially on an internally screw-threaded bush 24 formed at one end of a driving shaft 23. A radial flange 25 is formed on the shaft 23 near that one end thereof. A bolt 27 passes through a washer 26 into the bore of the bush 24 and co-operates with the screw-threading in the bore.

The arrangement is such that when the bolt 27 is loose, the two gears 21 and 22 can rotate relative to one another and to the bush 24, whilst, when the bolt 27 is tightened, the washer 26 presses the annulus 21 against the annulus 22 and presses the annulus 22 against the flange 25, whereupon rotation of the shaft 23 causes rotation of the annuli therewith, provided that there is sufficient friction between abutting radial-faces. Consequently, when the bolt is loose, the effective lengths of the cables can be adjusted by simply pulling each cable separately until the desired effective lengths are attained, the cables being subsequently coupled to one another and to the shaft by tightening the bolt 27. For better grip between abutting radial-faces, suitable roughening, for example milling, of those faces can be carried out, and/or resilient washers can be interposed between adjacent faces.

Instead of the relevant end of the driving shaft 23 being constructed as shown in Figure 6, the end could, for example, take the form of an axially-projecting, screw-threaded stay-bolt, and in that case two lock-nuts could co-operate with the screw-threading on the stay-bolt, whereby tightening and loosening of the lock-nuts would have the same effect as tightening and loosening of the bolt 27.

The construction described with reference to Figures 5 and 6 has the advantage over that described with reference to Figures 1 to 4 that extremely accurate independent adjustment of the effective lengths of the cables can be carried out, whereas in the first described case independent adjustment of the effective lengths of the cables can only be of an accuracy determined by the pitch of the screw-threading on the cables and of the teeth on the gear wheel.

After any necessary modification, the device could be used in conjunction with more than two cables.

I claim:

1. A device for axially adjusting two longitudinally-extending members movable lengthwise in opposite directions, said device comprising a housing, driving wheel means disposed within said housing, a shaft connected to said driving wheel means for driving the same, means for guiding one longitudinally-extending member past one side of said driving wheel means in driving engagement therewith, further means for guiding the other longitudinally-extending member past the other side of said driving wheel means in driving engagement therewith, and means operable to release at least one of said longitudinally-extending members from driving connection with the shaft whereby driving connection of the said one member with the shaft can be adjusted.

2. A device for axially adjusting two longitudinally-extending members movable lengthwise in opposite directions, said device comprising a housing, driving wheel means disposed within said housing, a shaft connected to said driving wheel means for driving the shaft portions in said housing for guiding one longitudinally-extending member past one side of said driving wheel means in driving engagement therewith, further portions in said housing for guiding the other longitudinally-extending member past the other side of said driving wheel means in driving engagement therewith, and means operable to release at least one of said longitudinally-extending members from driving connection with the shaft to permit adjustment thereof.

3. A device for axially adjusting longitudinally-extending members to move lengthwise in opposite directions, said device comprising a two-part housing, a driving wheel disposed mostly in one part of said housing but disposed partly in the other part of said housing, a shaft connected to said driving wheel for driving the same, portions in said one part of said housing for guiding one longitudinally-extending member through said one part of said housing and past one side of said driving wheel in driving engagement therewith, portions in said other part of said housing for guiding the other longitudinally-extending member through said other part of said housing and past the other side of said driving wheel in driving engagement therewith, and means attaching the two parts of said housing together and operable to release said other longitudinally-extending member from driving connection with the shaft by permitting said two parts to be separated whereby an axial adjustment of said members can be effected.

4. A device as claimed in claim 3, in which said driving wheel comprises a gear-wheel.

5. A device as claimed in claim 4, in which said means comprises screws which are readily removable.

6. A device for axially adjusting two longitudinally-extending members movable in opposite directions, said device comprising a housing, a first gear-wheel disposed within said housing, radial-face portions on said first gear-wheel, a second gear-wheel disposed within said housing, radial-face portions on said second gear-wheel abutting said first-mentioned radial-face portions, a shaft frictionally-connected to said first gear-wheel and said second gear-wheel for driving the same, means for guiding one longitudinally-extending member past said first gear-wheel in driving engagement therewith, further means for guiding the other longitudinally-extending member past said second gear-wheel in driving engagement therewith, and means operable to release both of said longitudinally-extending members from frictional connection with the shaft whereby an axial adjustment of said members can be effected.

7. A device as claimed in claim 6, wherein the shaft is internally screw-threaded at one end and the gear-wheels are mounted thereon, and said first gear-wheel extends slightly over said one end, there also being a radial flange on said shaft abutting said second gear-wheel, said means operable to release both of said longitudinally-extending members from frictional connection with the shaft comprising a bolt co-operating with the internal screw-threading in said shaft and pressing said first gear-wheel into frictional connection with said second gear-wheel and pressing said second gear-wheel into frictional connection with said radial flange, whereby loosening of said bolt releases the frictional connection between the gear-wheels and between the flange and said second gear-wheel.

8. A device as claimed in claim 7, wherein a washer is interposed between the head of said bolt and said first gear-wheel.

9. A device as claimed in claim 6, wherein an externally screw-threaded axial projection of a diameter less than that of said shaft extends from one end of said shaft, the gear-wheels being mounted on said one end and said first gear-wheel extending slightly over said one end, there also being a radial flange formed on said shaft near said one end thereof, said means operable to release both of said longitudinally-extending members from frictional connection which the shaft comprising two lock-nuts co-operating with the screw-threading on said projection and pressing said first gear-wheel into frictional connection with said second gear-wheel and pressing said second gear-wheel into frictional connection with said radial flange, whereby loosening of said two lock-nuts releases the frictional connection between said gear-wheels and between said second gear-wheel and said radial flange.

References Cited in the file of this patent

UNITED STATES PATENTS

| | | |
|---|---|---|
| 1,983,962 | Barber et al. | Dec. 11, 1934 |
| 2,599,760 | Hanson et al. | June 10, 1952 |
| 2,652,245 | Bentley | Sept. 15, 1953 |
| 2,833,537 | Hauck | May 6, 1958 |